(12) United States Patent
Feng et al.

(10) Patent No.: US 9,383,488 B2
(45) Date of Patent: Jul. 5, 2016

(54) COLOR FILTER SUBSTRATE, MANUFACTURING METHOD THEREFOR AND 3D DISPLAY DEVICE

(71) Applicants: BOE TECHNOLOGY GROUP CO., LTD., Beijing (CN); CHENGDU BOE OPTOELECTRONICS TECHNOLOGY CO., LTD., Chengdu (CN)

(72) Inventors: Yuanming Feng, Beijing (CN); Ni Jiang, Beijing (CN); Falu Yang, Beijing (CN); Junhwan Lim, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 14/125,659

(22) PCT Filed: Feb. 21, 2013

(86) PCT No.: PCT/CN2013/071740
§ 371 (c)(1),
(2) Date: Dec. 12, 2013

(87) PCT Pub. No.: WO2013/123887
PCT Pub. Date: Aug. 29, 2013

(65) Prior Publication Data
US 2014/0118823 A1    May 1, 2014

(30) Foreign Application Priority Data

Feb. 23, 2012 (CN) .......................... 2012 2 0064220

(51) Int. Cl.
*G02B 5/22* (2006.01)
*G02B 27/22* (2006.01)
(Continued)

(52) U.S. Cl.
CPC .. *G02B 5/22* (2013.01); *G02B 5/20* (2013.01); *G02B 27/2214* (2013.01);
(Continued)

(58) Field of Classification Search
CPC .. G02B 27/2214; G02B 3/0056; G02B 3/005; G02B 3/0062; H04N 13/0404; H04N 13/0409; H04N 13/0445; G03B 35/24
USPC ......... 359/463, 455, 458, 618–628, 727, 737, 359/741–743
See application file for complete search history.

(56) References Cited

U.S. PATENT DOCUMENTS

2004/0041747 A1* 3/2004 Uehara ................. G02B 3/005
345/6
2006/0114558 A1* 6/2006 Shimizu .............. G03B 21/625
359/457

(Continued)

FOREIGN PATENT DOCUMENTS

CN        1841129 A    10/2006
CN       102253494 A    11/2011
(Continued)

OTHER PUBLICATIONS

International Preliminary Report on Patentability for International Application No. PCT/CN2013/071740 dated Aug. 26, 2014, 9pgs.
(Continued)

*Primary Examiner* — Thomas K Pham
*Assistant Examiner* — Alberto Betancourt

(57) ABSTRACT

Disclosed are a color filter substrate, a manufacturing method therefor and a 3D display device. The color filter substrate comprises a substrate, a color filter unit and a cylindrical lens structure between the substrate and the color filter unit.

6 Claims, 2 Drawing Sheets

(51) Int. Cl.
  *H04N 13/04* (2006.01)
  *G02B 5/20* (2006.01)
  *G03B 35/24* (2006.01)
  *G02B 3/00* (2006.01)
  *G03B 21/625* (2014.01)
  *G03B 21/602* (2014.01)

(52) U.S. Cl.
  CPC ............ *H04N 13/0404* (2013.01); *G02B 3/005* (2013.01); *G02B 3/0062* (2013.01); *G02B 5/201* (2013.01); *G03B 21/602* (2013.01); *G03B 21/625* (2013.01); *G03B 35/24* (2013.01)

(56) References Cited

U.S. PATENT DOCUMENTS

| | | | |
|---|---|---|---|
| 2006/0256259 A1 | 11/2006 | Takagi et al. | |
| 2007/0019132 A1* | 1/2007 | Kim | B29C 43/021 349/95 |
| 2007/0047090 A1* | 3/2007 | Miyao | G02B 3/0031 359/619 |
| 2007/0177263 A1* | 8/2007 | Ono | 359/457 |
| 2008/0165399 A1 | 7/2008 | Ushiro et al. | |
| 2014/0118823 A1 | 5/2014 | Feng et al. | |

FOREIGN PATENT DOCUMENTS

| | | |
|---|---|---|
| CN | 202443141 U | 9/2012 |
| WO | 2005088364 A1 | 9/2005 |

OTHER PUBLICATIONS

English translation of Chinese Patent CN 202443141 U issued Sep. 19, 2012 (13 pages).
English translation of Chinese Patent CN 102253494 A issued Nov. 23, 2011 (27 pages).
English translation of Chinese Patent CN 1841129 A issued Oct. 4, 2006 (61 pages).
English translation of PCT Patent Application WO 2005/088364 A1, Sep. 22, 2005 (21 pages).
International Search Report issued by the International Searching Authority for PCT/CN2013/071740, May 23, 2013, (11 pages).

* cited by examiner

COLOR FILTER SUBSTRATE, MANUFACTURING METHOD THEREFOR AND 3D DISPLAY DEVICE

CROSS REFERENCE TO RELATED APPLICATIONS

This application is based on International Application No. PCT/CN2013/071740 filed on Feb. 21, 2013, which claims priority to Chinese National Application No. 201220064220.7 filed on Feb. 23, 2012, the contents of which are incorporated herein by reference.

TECHNICAL FIELD

Embodiments of the disclosure relate to a color filter substrate, a manufacturing method thereof and a three-dimension (3D) display device.

BACKGROUND

In recent years, 3D display techniques have attracted widespread concern with the development of the display technique and the increasing entertainment requirements of people. The current 3D display techniques are mainly divided into a glasses style and a naked-eye mode. In the glasses mode of 3D display techniques, users have to wear glasses; however, longtime watching will lead to eyestrain and reduce the watching comfort. The naked-eye mode of 3D display technique will become the major trend of the 3D display technique in the future, and an improvement to the display panel will be the key point for development of the naked-eye 3D display technique.

Naked-eye 3D display technique mainly includes a parallax barrier method, a line light source method, a lenticular lens grating method, and a directional backlight method, etc. In the lenticular lens 3D display technique, a layer of lenticular lens is attached in front of a display screen. In this way, the two eyes of a viewer watch the display screen at different angles, so that the left and right eyes can receive two different 2D images respectively. The human brain can perceive the image as a 3D image upon receiving the different 2D images seen by the left and right eyes. The lenticular lens 3D display technique is mostly advantageous in increasing transmittance and achieving high-brightness 3D display.

One present lenticular lens 3D display device mainly comprises a liquid crystal display cell and a lens layer attached to the liquid crystal display cell. In order to realize 3D display, high alignment precision is required between the pixels of the liquid crystal display cell and the electrodes of the lens structure when the lens structure is to be attached to the liquid crystal display cell; or otherwise, the display quality will be affected. However, the exiting attaching processes severely limit the improvement in precision.

SUMMARY (I) Technical Problem to be Resolved

The technical problem to be resolved for the embodiments of the disclosure is to provide color filter substrates and 3D display devices, which have the display quality not influenced by the alignment precision between the lenticular lens and the liquid crystal display cell, and have simple operation and low costs.

(II) Technical Solution

In order to resolve the above problem, an embodiment of the disclosure provides a color filter substrate, which includes a substrate, a color filter unit, and a lenticular lens structure disposed between the substrate and the color filter unit.

For example the lenticular lens structure is a single-layer lenticular lens array, which is composed of a plurality of lenticular lenses arranged in a planar direction where the color filer unit is located. Each lenticular lens is composed of two kinds of lenses having different refractive indexes.

For example the two kinds of lenses having different refractive indexes include a first lens and a second lens in order from the substrate to the color filter unit. The refractive index of the first lens is smaller than that of the second lens and larger than or equal to that of the substrate.

For example the first lens is a plane-concave lens, and the second lens is a plane-convex lens.

For example the plane-convex lens is correspondingly embedded in the plane-concave lens.

For example the curvature radii of the cambered surfaces of the plane-concave lens and the plane-convex lens are equal.

For example the cambered surfaces of the plane-concave lens and the plane-convex lens are semicircular.

For example a thickness of the plane-convex lens is equal to the focal length of the object side thereof.

For example a lenticular lens structure is a single-layer lenticular lens array, which is composed of a plurality of lenticular lenses arranged in a planar direction where the color filer unit is located. The lenticular lens is composed of one layer of concave lens or one layer of convex lens.

An embodiment of the disclosure also provides a manufacturing method for the color filter substrate including S1) applying resin to the glass substrate, and fabricating a plane-concave lens by exposure and developing; S2) applying another kind of resin to the substrate obtained from S1, and leveling on the concave surface of the plane-concave lens to form a plane-convex lens; S3) performing planarization process to the substrate obtained from S2, and fabricating a black matrix and a color filter resin layer by exposure and developing; and S4) forming a lens electrode on the substrate obtained from S3.

An embodiment of the disclosure also provides a 3D display device, which includes the above color filter substrate.

(III) Advantageous Effects

In the color filter substrate and 3D display device of these embodiments of the disclosure, the 3D display device is manufactured by combining the lenticular lens forming process into the process of the color filter substrate. Compared with the existing 3D display device, the attaching process can be removed, the problem generated by the requirement for the alignment precision when using the lenticular lens to realize 3D display is avoided, the crosstalk is decreased, and the 3D display quality is improved.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

The color filter substrate, the manufacturing method thereof and the 3D display device provided in the embodiments of the disclosure will be described in detail according to the attached figures thereafter.

Embodiment 1

Figure 1:
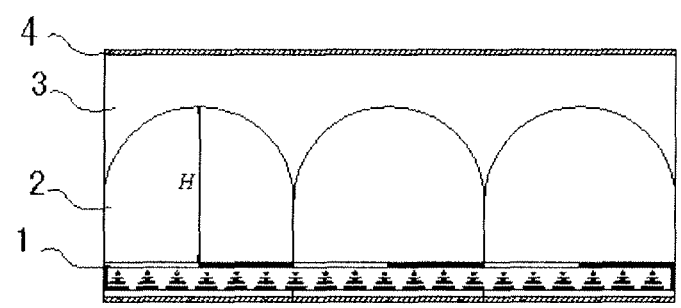
FIG. 1 is a structure diagram of the color filter substrate according to an embodiment of the disclosure.

As illustrated in FIG. 1, the color filter substrate according to embodiment 1 of the disclosure comprises a glass substrate 4, a color filter unit 1, and a lenticular lens structure which is disposed between the glass substrate 4 and the color filter unit 1. In the color filter substrate of this embodiment, the color filter unit 1 is a color-filter resin layer, preferably a color filter resin layer of three-primary-color. The three primary colors may be red, green and blue, or any other three colors meeting the requirements of the three primary colors. The color filter resin layer may also be a color filter resin layer of four-primary-color or any other color filter resin layer, which does not bring a limitation to the technical proposal in this embodiment of the disclosure.

For example the lenticular lens structure is a lenticular lens array, which is formed of a plurality of lenticular lenses arranged periodically (as illustrated in FIG. 1, taking color filter resin of three primary color as example, a half of each lens corresponds to the color filter resin of one color in a group of color filter resins of red, green and blue, but not limited thereto). The lenticular lens is composed of two kinds of lenses having different refractive indexes.

For example, the two kinds of lenses having different refractive indexes include plane-concave lenses 3 and plane-convex lenses 2 provided in order from the glass substrate 4 to the color filter resin layer. The plane-convex lenses 2 are correspondingly embedded in the plane-concave lenses 3. The refractive index n1 of the plane-convex lenses 2 is larger than the refractive index n2 of the plane-concave lenses 3, and the refractive index n2 of the plane-concave lenses 3 is equal to the refractive index n3 of the glass substrate. Optionally, in order that the formation of image (i.e., the path of the light) can not be affected, the cambered curvature of the plane-convex lenses 2 and the plane-concave lenses 3 are equal to each other, and the thickness H of the plane-convex lenses 2 is equal to the focal length f of the object side thereof.

Optionally, an embodiment of the disclosure also provides another color filter substrate, which is different from the above color filter substrate in that the lenticular lens is composed of a single layer of concave lenses or a single layer of convex lenses. It is better for reduction of processes and decrease of costs due to such a structure.

Optionally, the lenticular lens can adopt other structures such as a quarter circle lens, as long as the light emergent from each pixel of the display is incident into the left and right eyes of viewers respectively.

Embodiment 2

The embodiment of the disclosure also provides a 3D display device including the above color filter substrate, such as a liquid crystal display device and an OLED display device. Except for the above color filter substrate, the other components of the 3D display device, such as the array substrate, can be fabricated by the existing techniques, which are not to be described in detail herein, and such components and manufacturing process bring no restriction to the embodiment of the disclosure. The manufacturing processes of these components include filling of liquid crystal between the array substrate and the color filter substrate and assembling the two substrates together to form a cell.

The display principle of the 3D display device in the embodiments of the disclosure is as follows.

Figure 2:
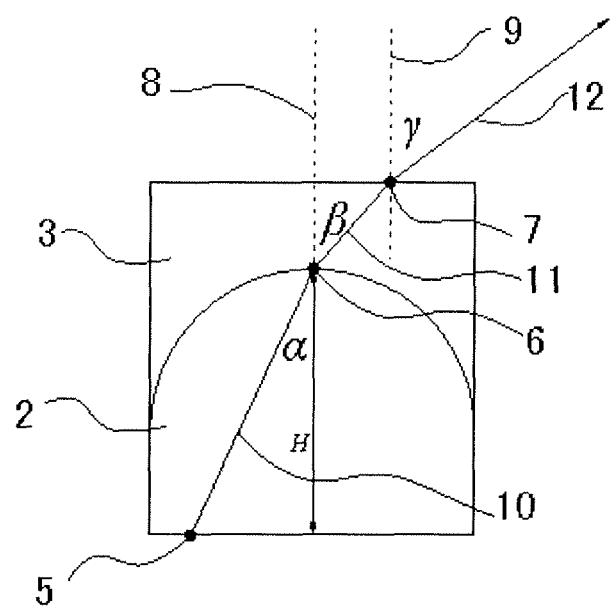
FIG. 2 is the image forming principle diagram for the color filter substrate and 3D display device according to an embodiment of the disclosure.

As illustrated in FIG. 2, a point light source 5 on the plane-convex lens 2 is examined. Given that the thickness H of one plane-convex lens 2 is equal to the focal length f of the object side, the light emitted from the point light source 5 is emergent in parallel after passing through the lens. Therefore, only one light ray is examined. In the convex lens 2, the light emitted from the point light source 5 arrives at the point 6; the refractive indexes at the two side of the convexity are different from each other. Because the refractive index n1 of the plane-convex lens 2 is larger than the refractive index n2 of the plane-concave lens 3, the incident angle $\alpha$ (the included angle between the incident light 10 and the normal line 8) is smaller than the refractive angle $\beta$ according to the Snell Law $n1 \sin \alpha = n2 \sin \beta$. In a similar way, the incident angle $\beta$ (the included angle between the incident light 11 and the normal line 9) is smaller than the refractive angle $\gamma$ (the included angle between the refracted light 12 and the normal line 9) when the light is emergent from the lens 3 into the air (the refractive index of which is equal to 1). The light emergent from the point light source 5 transmits to the right side as a whole after passing through the lens therefore. The light exits from the substrate into the air at the point 7.

Figure 3:
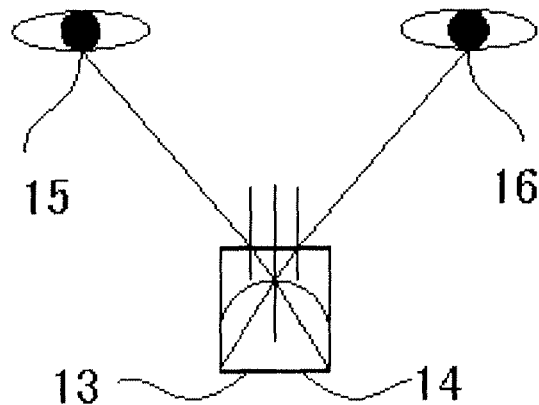
FIG. 3 is the image forming principle diagram for the color filter substrate and 3D display device according to an embodiment of the disclosure.

To sum up, as illustrated in FIGS. 2 and 3, the emergent light from the left color filter resin 13 is emergent to the right direction after passing through the plane-convex lens 2 and plane-concave lens 3 and arrives at the left eye 16; in the similar way, the emergent light from the right color filter resin 14 is emergent to the left direction after passing through the plane-convex lens 2 and plane-concave lens 3 and arrives at the right eye 15. That is, the image of the left side color filter resin arrives at the left eye, and the image of the right side color filter resin arrives at the right eye. Therefore, the left and right eyes see the left eye image and the right eye image respectively, and then a 3D image is formed through the compounding of the brain.

Embodiment 3

The embodiment in the disclosure provides a manufacturing method for the above color filter substrate, specifically including S1. Applying resin to the glass substrate, and fabricating a plane-concave lens by exposure and developing;

S2. Applying another kind of resin to the substrate obtained from S1, and leveling on the concave surface of the plane-concave lens to form a plane-convex lens;

S3. Performing a planarization process to the substrate obtained from S2, and fabricating a black matrix and a color filter resin layer by exposure and developing;

S4. Forming a transparent electrode such as an ITO electrode by a process such as magnetron sputtering on the substrate obtained from S3.

The above steps may also be completed with other specific processes known in this field, and will not be described in detail herein. After the above steps are carried out, the array substrate can be fabricated by the process known in this field, and the array substrate and the above color filter substrate are assembled together to form the 3D display device in the embodiment of the disclosure.

A specific example is given thereinafter to describe in detail the manufacturing dimension of the plane-concave lens and the plane-convex lens in this embodiment.

Figure 4:
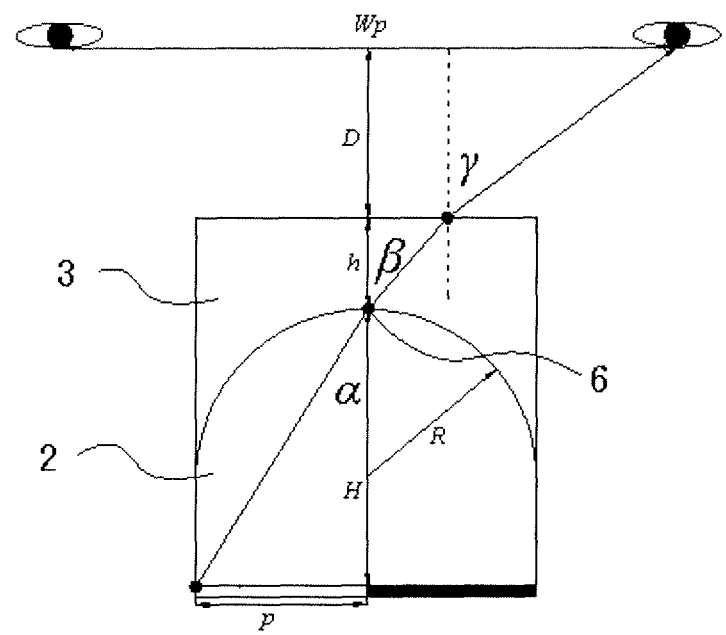
FIG. 4 is the light path figure of image forming for the color filter substrate and 3D display device according to an embodiment of the disclosure.

For example as illustrated in FIG. 4, in the color filter substrate of the 3D display device in this embodiment, the cambered surfaces of the plane-concave lens 3 and the plane-convex lens 2 are both semi-circles, and the curvature radius R of the cambered surface is equal to the size p of the color filter resin. Herein, Wp is the pupil distance of the human eyes, D is the distance between the eyes of the viewer and the display device, and h is the vertical distance between the vertex 6 of the plane-convex lens 3 and the surface of the glass substrate.

The height of the plane-convex lens 2, i.e., the vertical distance H from the vertex 6 to the color filter unit, can be obtained according to the image-forming principle of the lens.

The relationship between the focal length and the curvature radii can be obtained according to the image-forming principle of the convex lens:

$$f = \frac{2n_1 - n_2}{n_1 - n_2} R \qquad (1)$$

and $R = p$, so $$f = H = \frac{2n_1 - n_2}{n_1 - n_2} p \qquad (2)$$

The dimensions of the plane-concave lens 3 can be calculated according to the Shell Law after acquiring the thickness H of the plane-convex lens, i.e., the distance h from the vertex 6 to the surface of the glass.

The refractive relationship when the light passing through the interface of the plane-convex lens 2 and the plane-concave lens 3 is that:

$$n_1 \sin \alpha = n_2 \sin \beta \qquad (3)$$

wherein $\alpha = \arctan(p/H)$, and then $$\beta = \arcsin\left[\frac{n_1}{n_2} \sin\left(\arctan \frac{p}{H}\right)\right] \qquad (4)$$

When the light enters the air from the interface of the glass substrate, $$n_2 \sin \beta = \sin \gamma \qquad (5)$$

and therefore $$\gamma = \arcsin\left[n_1 \sin\left(\arctan \frac{p}{H}\right)\right] \qquad (6)$$

Finally, the following can be obtained according to the geometrical relationship between the interpupillary distance of human eyes and the watching distance, $$h \tan \beta + D \tan \gamma = W_p \qquad (7)$$

The thickness h of the plane-concave lens can be obtained by substituting the equation (4) and (6) into the equation (7), $$h = \frac{W_p - D \tan \gamma}{\tan \beta} \qquad (8)$$

As have discussed above, the calculation equations for the plane-concave lens and the plane-convex lens are obtained. In the practical manufacturing process, the specific dimensions of the plane-concave lens and the plane-convex lens to be manufactured can be obtained using the above equations firstly, and then the plane-concave lens and the plane-convex lens having the exact dimensions can be obtained.

Specific numeric values are given thereinafter as examples to calculate the dimensions of the plane-convex lens and the plane-concave lens, e.g., the size p of the color filter resin is 0.05 mm; the refractive index $n_1$ of the plane-convex lens 2 is equal to 1.56; the refractive index $n_2$ of the plane-concave lens 3 is the same as that of the glass substrate, and is equal to 1.5; the distance D between the liquid crystal cell and the viewer is 280 mm; and the interpupillary distance W of the human eyes is 65 mm. In terms of the above equations, it can be calculated that the curvature radii of the cambered surfaces of the plane-convex lens 2 and plane-concave lens 3 is equal to 0.05 mm, the distance H from the vertex 6 of the plane-convex lens to the color filter resin is 1.35 mm, and the distance h from the vertex 6 of the plane-concave lens to the surface of the glass substrate is 1.267 mm. Thereby, in the manufacturing process of the color filter substrate, the plane-concave lens and the plane-convex lens having the above dimensions can be manufactured using the above specific numeric values.

The above implementations are just used to explain while not to limit the embodiments of the disclosure. Those skilled of general technology in the related technical field can still make various kinds of modifications and variations without deflecting the spirit and scope of the embodiments of the disclosure, so that all the equivalent technical proposals will all fall into the scope of the embodiments of the disclosure and the patent protection scope of the embodiments of the disclosure should be limited by the claims.

The invention claimed is:

1. A color filter substrate comprising a substrate, a color filter unit, and a lenticular lens structure which is disposed between the substrate and the color filter unit, wherein the lenticular lens structure is a single-layer lenticular lens array, which is composed of a plurality of lenticular lenses arranged in a planar direction where the color filer unit is located; and each lenticular lens consists of two kinds of lenses having different refractive indexes, wherein the two kinds of lenses having different refractive indexes include a first lens and a second lens in order from the substrate to the color filter unit; the refractive index of the first lens is smaller than that of the second lens and larger than or equal to that of the substrate, wherein the first lens is a plane-concave lens, and the second lens is a plane-convex lens, said plane-convex lens is correspondingly embedded in the plane-concave lens;

wherein a thickness H of the plane-convex lens is obtained by:

$$f = H = \frac{2n_1 - n_2}{n_1 - n_2} p, \quad (1)$$

where n1 is the refractive index of the plane-convex lens, n2 is the refractive index of the plane-concave lens, and p is the size of the color filter resin, and wherein a thickness h of the plane-concave lens is obtained by:

$$h = \frac{W_p - D\tan\gamma}{\tan\beta}, \quad (2)$$

where $W_p$ is the interpupillary distance of human eyes, D is the distance between human eyes and the display device, β is the incident angle of the light emitted from the side of the plane-concave lens to the interface between the plane-concave lens and the substrate, and the emergent angle of the light is refraction angle γ.

2. The color filter substrate according to claim 1, wherein curvature radii of cambered surfaces of the plane-concave lens and the plane-convex lens are equal.

3. The color filter substrate according to claim 1, wherein the cambered surfaces of the plane-concave lens and the plane-convex lens are semicircular.

4. The color filter substrate according to claim 1, wherein a thickness of the plane-convex lens is equal to a focal length of an object side thereof.

5. The color filter substrate according to claim 1, wherein the lenticular lens structure is a single-layer lenticular lens array, which is composed of a plurality of lenticular lenses arranged in a planar direction where the color filer unit is located; the lenticular lens is composed of one layer of concave lens or one layer of convex lens.

6. A 3D display device comprising
a color filter substrate according to claim 1; and
an array substrate disposed opposite to the color filter substrate.

* * * * *